United States Patent
Ford et al.

(10) Patent No.: US 8,090,614 B2
(45) Date of Patent: *Jan. 3, 2012

(54) GENERATING A SALES VOLUME FORECAST

(75) Inventors: Charles P. Ford, Dallas, TX (US); Wei Cao, Irving, TX (US)

(73) Assignee: JDA Software Group, Inc., Scottsdale, AZ (US)

( * ) Notice: Subject to any disclaimer, the term of this patent is extended or adjusted under 35 U.S.C. 154(b) by 1106 days.

This patent is subject to a terminal disclaimer.

(21) Appl. No.: 11/876,984

(22) Filed: Oct. 23, 2007

(65) Prior Publication Data

US 2008/0040204 A1    Feb. 14, 2008

Related U.S. Application Data

(63) Continuation of application No. 10/103,342, filed on Mar. 19, 2002, now Pat. No. 7,324,955.

(60) Provisional application No. 60/356,379, filed on Feb. 11, 2002.

(51) Int. Cl.
*G06F 17/30* (2006.01)

(52) U.S. Cl. .................................... 705/7.31

(58) Field of Classification Search .......... 705/10
See application file for complete search history.

(56) References Cited

U.S. PATENT DOCUMENTS

| | | | |
|---|---|---|---|
| 5,128,861 A | 7/1992 | Kagami et al. | |
| 5,299,115 A | 3/1994 | Fields et al. | |
| 5,377,095 A | 12/1994 | Maeda et al. | |
| 5,832,456 A | 11/1998 | Fox et al. | |
| 6,029,139 A * | 2/2000 | Cunningham et al. | 705/7.29 |
| 6,032,125 A | 2/2000 | Ando | |
| 6,151,582 A * | 11/2000 | Huang et al. | 705/7.25 |
| 6,393,406 B1 | 5/2002 | Eder | |
| 6,708,156 B1 * | 3/2004 | Gonten | 705/7.31 |
| 6,976,001 B1 | 12/2005 | Levanoni et al. | |
| 7,054,837 B2 * | 5/2006 | Hoffman et al. | 705/28 |
| 7,072,863 B1 | 7/2006 | Phillips et al. | |
| 7,133,848 B2 | 11/2006 | Phillips et al. | |
| 7,197,474 B1 | 3/2007 | Kitts | |
| 7,246,079 B2 | 7/2007 | Ando et al. | |

OTHER PUBLICATIONS

Jane E. Lapin, "A Primer in Consumer Marketing", Mar. 1994, Research and Special Program Administration, pp. 1-100.

(Continued)

*Primary Examiner* — Romain Jeanty
(74) *Attorney, Agent, or Firm* — Booth Udall, PLC; Steven J. Laureanti

(57) ABSTRACT

A method for generating a sales volume forecast includes receiving user input specifying a hypothetical asking price and a future date and accessing, for each of multiple past time periods, historical data reflecting a sales volume for an item over the past time period and a corresponding price difference between an asking price and a coinciding market price for the item, the price difference also being associated with the past time period. The method also includes determining a historical correlation for the item between sales volume and price difference between asking price and coinciding market price, accessing market data reflecting a future market price for the item associated with the specified future date, determining a price difference between the specified hypothetical asking price and the future market price for the item, applying the determined historical correlation to the determined price difference to generate a sales volume forecast, and providing the generated sales volume forecast for access by a user.

18 Claims, 1 Drawing Sheet

OTHER PUBLICATIONS

Gardner, Bruce L., "Futures Prices in Supply Analysis", American Journal of Agricultural Economics, vol. 58, No. 1, Feb. 1976, pp. 81-84.

Peck, Anne E., "Futures Markets, Supply Response, and Price Stability", The Quarterly Journal of Economincs, vol. 90, No. 3, Aug. 1976, pp. 407-423.

* cited by examiner

GENERATING A SALES VOLUME FORECAST

CLAIM OF PRIORITY

This application is a continuation of U.S. patent application Ser. No. 10/103,342, filed on 19 Mar. 2002 and entitled "GENERATING A SALES VOLUME FORECAST", which claims the benefit under 35 U.S.C. §119(e) of U.S. Provisional Application Ser. No. 60/356,379, filed 11 Feb. 2002. U.S. patent application Ser. No. 10/103,342 and U.S. Provisional Application Ser. No. 60/356,379 are commonly assigned to the assignee of the present application. The disclosure of related U.S. patent application Ser. No. 10/103,342 and U.S. Provisional Application Ser. No. 60/356,379 are hereby incorporated by reference into the present disclosure as if fully set forth herein.

BACKGROUND

1. Technical Field of the Invention

This invention relates generally to business planning and more particularly to generating a sales volume forecast.

2. Background of the Invention

Forecasting the volume of sales for one or more items may be an important part of business planning. For example, an enterprise may forecast the volume of sales for an item at different asking prices to determine a suitable asking price for the item. As another example, an enterprise may forecast the volume of sales for different items to determine how resources should be allocated for the manufacturing of those items. Traditionally, systems for making such forecasts have compared historical asking price increases, historical asking price decreases, historical offered discounts, and other historical "events" on the part of an enterprise with historical sales volumes for that enterprise to forecast the volume of sales for that enterprise. However, the accuracy of such forecasts has been limited.

SUMMARY OF THE INVENTION

According to the present invention, disadvantages and problems associated with previous sales volume forecasting techniques may be substantially reduced or eliminated.

In one embodiment of the present invention, a method for generating a sales volume forecast includes receiving user input specifying a hypothetical asking price and a future date. The method also includes accessing, for each of multiple past time periods, historical data reflecting a sales volume for an item over the past time period and a corresponding price difference between an asking price and a coinciding market price for the item, the price difference also being associated with the past time period. The method also includes determining a historical correlation for the item between sales volume and price difference between asking price and coinciding market price, accessing market data reflecting a future market price for the item associated with the specified future date, determining a price difference between the specified hypothetical asking price and the future market price for the item, applying the determined historical correlation to the determined price difference to generate a sales volume forecast, and providing the generated sales volume forecast for access by a user.

Particular embodiments of the present invention may provide one or more technical advantages. Particular embodiments may provide sales volume forecasts that take into account one or more relationships between events on the part of an enterprise and the overall market. For example, particular embodiments may generate a sales volume forecast by determining a historical correlation between sales volume and the price difference between asking price and coinciding market price and applying that historical correlation to a hypothetical price difference between asking price and coinciding market price. Such an approach may provide more accurate sales volume forecasts, which in turn may improve one or more aspects of business planning. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description, taken in conjunction with the accompanying drawings, in which.

DETAILED DESCRIPTION OF THE DRAWINGS

Figure 1:
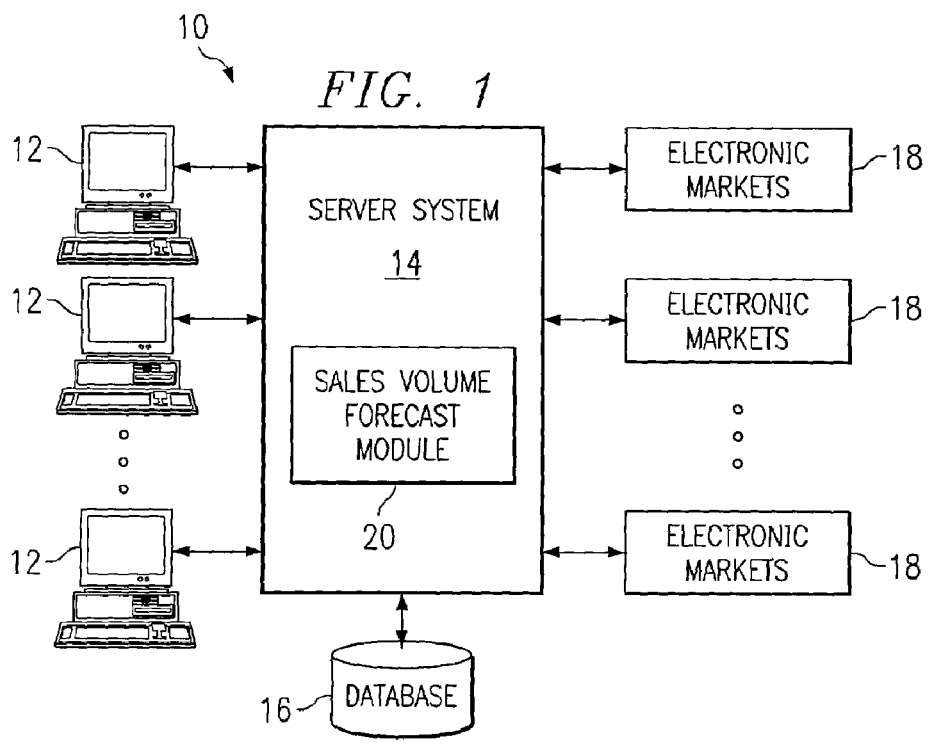
FIG. 1 illustrates an example system for generating a sales volume forecast.

FIG. 1 illustrates an example system 10 for generating a sales volume forecast. System 10 may include one or more client systems 12 coupled to a server system 14, which may in turn be coupled to database system 16 and one or more electronic markets 18. Client systems 12, server system 14, database system 16, and electronic markets 18 may be coupled to each other using links that may each include one or more computer buses, local area networks (LANs), metropolitan area networks (MANs), wide area networks (WANs), portions of the Internet, or any other appropriate wireline, optical, wireless, or other links. Server system 14 may support a sales volume forecast module 20, which may generate sales volume forecasts using inputs received from users via client systems 12 and information from database system 16 and electronic markets 18. Sales volume forecast module 20 may be implemented using software executed at one or more computers associated with server system 14. Each such computer may include one or more suitable input devices, output devices, mass storage media, processors, memory, communications interfaces, or other components for receiving, processing, storing, and communicating information according to the operation of system 10. Database system 16 may include any suitable data storage media, and reference to "database" is meant to encompass all such data storage media and associated data structures as are appropriate. Electronic markets 18 may include any suitable markets supporting transactions between buyers and sellers. For example, an electronic market 18 may include an open mercantile exchange where commodity futures contracts for one or more commodities are bought and sold.

To generate a sales volume forecast, sales volume forecast module 20 may determine a historical correlation between sales volume and the price difference between asking price and coinciding market price and apply the historical correlation to a hypothetical price difference between asking price and coinciding market price. Sales volume forecast module 20 may generate sales volume forecasts particular to an item and an enterprise. Items may include raw materials, component parts, products, or other items that may be the subject of transactions between buyers and sellers and may include lots, blocks, bundles, bushels, or other suitable units of one or more individual items. In addition or as an alternative, sales volume forecast module 20 may, in particular embodiments, generate sales volume forecasts that span a number of items, a number of enterprises, or both.

Sales volume forecast module 20 may determine a historical correlation between sales volume and the price difference between asking price and coinciding market price using any suitable technique. In particular embodiments, for example, sales volume forecast module 20 may use a mathematical regression technique to determine a historical correlation between sales volume and the price difference between asking price and coinciding market price, which correlation may be represented as an equation of any suitable order including any suitable number of independent and dependent variables. The data used to determine such a correlation may include a number of data units that each reflect a volume of sales for an item and an enterprise over a period of time and a corresponding price difference between an asking price and a coinciding market price. Although data units are described as an example, data used to determine a historical correlation between asking price and coinciding market price may include any suitable data in any suitable format accessed in any suitable manner. Such data may be contained within database system 16. In addition or as an alternative, such data may be stored by one or more electronic markets 18. The time periods over which sales volumes are reflected in such data units may vary in length from data unit to data unit and may, where appropriate, overlap.

Sales volumes reflected in data units used to determine a historical correlation between sales volume and the price difference between asking price and coinciding market price may include quantities of items that were sold. Where a generated sales volume forecast is particular to an item and an enterprise, such sales volumes may include quantities of the item that were sold by the enterprise. For example only and not by way of limitation, one data unit used to determine a historical correlation between sales volume and the price difference between asking price and coinciding market price may indicate that XYZ Corporation sold two thousand units of item A in July 2000 at an asking price that was five cents below a July 2000 market price for item A, another data unit may indicate that XYZ Corporation sold one thousand five hundred units of item A in August 2000 at an asking price seven cents below an August 2000 market price for item A, another data unit may indicate that XYZ Corporation sold two thousand five hundred units of item A in September 2000 at an asking price three cents below a September 2000 market price for item A, and so on.

Price differences reflected in data units used to determine a historical correlation between sales volume and the price difference between asking price and coinciding market price may include actual price differences, proportional price differences, or both. Asking prices on which such price differences are based may include prices asked for one or more items. Where appropriate, such asking prices may each include a combination of different asking prices, such as an average asking price over a period of time, across a number of different markets, or both. Where a generated sales volume forecast is particular to an item and an enterprise, such asking prices may include prices asked for the item by the enterprise.

Market prices on which such price differences are based may include any suitable market prices, such as futures contract prices. Additionally, market prices on which such price differences are based may, where appropriate, include a combination of different market prices, such as average market prices over periods of time, across a number of different markets, or both. For example only an not by way of limitation, one data unit used to determine a historical correlation between sales volume and the price difference between asking price and coinciding market price may indicate that XYZ Corporation sold two thousand units of item A in July 2000 at an asking price that was five cents below an expiration price for futures contracts for item A that expired in July 2000, another data unit may indicate that XYZ Corporation sold one thousand five hundred units of item A in August 2000 at an asking price seven cents below an expiration price for futures contracts for item A that expired in August 2000, another data unit may indicate that XYZ Corporation sold two thousand five hundred units of item A in September 2000 at an asking price three cents below an expiration price for futures contracts for item A that expired in September 2000, and so on. Although expiration prices of futures contracts are described as an example, market prices on which price differences reflected in data units used to determine a historical correlation between sales volume and the price difference between asking price and coinciding market price are based may include any suitable futures contract prices or other market prices.

A hypothetical price difference between asking price and coinciding market price to which a historical correlation determined by sales volume forecast module 20 may be applied may include a price difference between an asking price specified by a user and a coinciding market price. A market prices on which a hypothetical price difference is based may include any suitable market price, such as a current price for futures contracts set to expire on a date specified by a user or an associated date. For example, a user may specify a hypothetical asking price for an item and a future date (which may include a future period of time) for a sales volume forecast, and the market price on which the hypothetical price difference for the sales volume forecast is based may include a current price for futures contracts set to expire on the specified future date or a date associated with the specified future date. Although current prices for futures contracts set to expire on a specified future date or associated date are described as an example, the present invention contemplates hypothetical price differences based on any suitable futures contracts prices or other market prices. A current market price may include a market price as of the close of the previous business day. Market prices on which hypothetical price differences are based may include a combination of market prices, such as an average market price over a period of time, across a number of different markets, or both. Market prices on which hypothetical price differences are based may be stored by one or more electronic markets and accessed by sales volume forecast module 20 in any suitable manner. In addition or as an alternative, such market prices may be contained within database system 16.

Sales volume forecasts generated by sales volume forecast module 20 may be used in any suitable manner. For example only and not by way of limitation, sales volume forecast module 20 may generate for a gasoline producer sales volume forecasts for different types of gasoline (such as various grades of unleaded gasoline, diesel, aviation fuel, etc.) that may be produced from one or more types of petroleum. Data for generating these forecasts may include data reflecting sales volume and asking price history for the gasoline producer and data reflecting historical, current, and future market prices for the different types of gasoline. Using the generated sales volume forecasts, the gasoline producer may determine how much of each type of gasoline to produce using the petroleum supplies of the gasoline producer and how much of the petroleum supplies of the gasoline producer to trade with other, competing gasoline producers to increase profits realized by the gasoline producer in the future.

Figure 2:
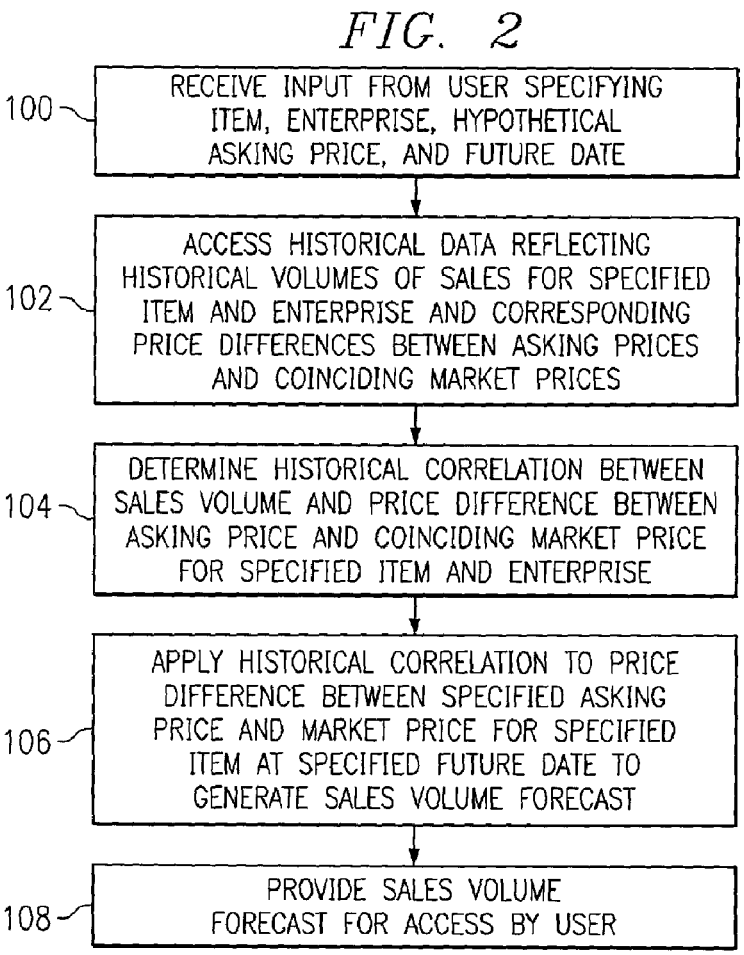
FIG. 2 illustrates an example method for generating a sales volume forecast.

FIG. 2 illustrates an example method for generating a sales volume forecast. The method begins at step 100, where sales volume forecast module 20 receives input from a user specifying an item, enterprise, hypothetical asking price, and future date. As described above, such input may be received from the user via a client system 12 coupled to server system 14. Although sales volume forecast module 20 is described as performing various tasks associated with generating a sales volume forecast, any suitable component associated with system 10 may perform one or more of these tasks. Although user input specifying an item, enterprise, hypothetical asking price, and future date is described as an example, any suitable input may be used to generate a sales volume forecast. For example, sales volume forecast module 20 may generate sales volume forecasts for a particular enterprise without users providing input specifying an enterprise. At step 102, sales volume forecast module 20 accesses historical data reflecting historical volumes of sales for the specified item and enterprise and corresponding price differences between asking prices and coinciding market prices. The historical data accessed by sales volume forecast module 20 may include all available data reflecting historical sales volumes and corresponding price differences. In addition or as an alternative, such historical data may include data reflecting historical sales volumes and corresponding price differences over a particular period of time. As described above, sales volume forecast module 20 may access historical data in any suitable manner, and all or certain portions of such data may be contained within database system 16, stored by one or more electronic markets 18, or both.

At step 104, sales volume forecast module 20 determines a historical correlation between sales volume and the price difference between asking price and coinciding market price for the specified item and enterprise. As described above, this correlation may be determined using a mathematical regression technique to determine the historical correlation, which may be represented as an equation of any suitable order including any suitable number of independent and dependent variables. At step 106, sales volume forecast module 20 applies the determined historical correlation to the price difference between the specified asking price and a market price for the specified item at the specified future date to generate a sales volume forecast. As described above, the market price on which the price difference to which the determined historical correlation is applied may include any suitable market price. For example, the market price may include a current price for futures contracts for the specified item set to expire on the specified date or an associated date. At step 108, sales volume forecast module 20 provides the generated sales volume forecast for access by one or more users, and the method ends.

Although the present invention has been described with several embodiments, divers changes, substitutions, variations, alterations, and modifications may be suggested to one skilled in the art, and it is intended that the invention may encompass all such changes, substitutions, variations, alterations, and modifications falling within the spirit and scope of the appended claims.

What is claimed is:

1. A system for generating a sales volume forecast, the system comprising:
one or more computer systems comprising a processor and a memory, each of the one or more computer systems configured to:
access historical data reflecting a sales volume for one or more items and a first price difference between an asking price and a market price for the one or more items;
determine a historical correlation for each of the one or more items between the sales volume and the first price difference;
access a second price difference between an asking price and a market price for each of the one or more items;
apply the determined historical correlation to the second price difference to generate a sales volume forecast for each of the one or more items; and
store the generated sales volume forecast for each of the one or more items, wherein an asking price comprises at least one of an average asking price over a period of time, an average asking price across a number of different markets or a price asked for one or more items by an enterprise.

2. The system of claim 1, wherein the market price is a market price selected from the group consisting of:
a market price associated with a particular market;
a futures contract price;
an expiration price for futures contract;
an average market price over periods of time; and
an average market price across a number of different markets.

3. The system of claim 1, wherein the one or more computer systems is further configured to:
access a future date;
access market data reflecting a future market price for the one or more items, the future market price being associated with the accessed future date;
determine a third price difference between an asking price and the future market price for each of the one or more items;
apply the determined historical correlation to the determined third price difference to generate a corresponding sales volume forecast for each of the one or more items; and
store the generated corresponding sales volume forecast for each of the one or more items.

4. The system of claim 1, wherein the one or more computer systems is further configured to use a mathematical regression technique to determine the historical correlation for each of the one or more items between the sales volume and the first price difference.

5. The system of claim 1, wherein the first price difference between an asking price and a market price is either actual or proportional to either the asking price or the market price.

6. The system of claim 1, wherein the second price difference between an asking price and a market price is either actual or proportional to either the asking price or the market price.

7. A method of generating a sales volume forecast, comprising:
accessing, by a computer, historical data reflecting a sales volume for one or more items and a first price difference between an asking price and a market price for the one or more items;
determining, by the computer, a historical correlation for each of the one or more items between the sales volume and the first price difference;
accessing, by the computer, a second price difference between an asking price and a market price for each of the one or more items;

applying, by the computer, the determined historical correlation to the second price difference to generate a sales volume forecast for each of the one or more items; and storing, by the computer, the generated sales volume forecast for each of the one or more items, wherein an asking price comprises at least one of an average asking price over a period of time, an average asking price across a number of different markets or a price asked for one or more items by an enterprise.

8. The method of claim 7, wherein the market price is a market price selected from the group consisting of:
a market price associated with a particular market;
a futures contract price;
an expiration price for futures contract;
an average market price over periods of time; and
an average market price across a number of different markets.

9. The method of claim 7, further comprising:
accessing a future date;
accessing market data reflecting a future market price for the one or more items, the future market price being associated with the accessed future date;
determining a third price difference between an asking price and the future market price for each of the one or more items;
applying the determined historical correlation to the determined third price difference to generate a corresponding sales volume forecast for each of the one or more items; and
storing the generated corresponding sales volume forecast for each of the one or more items.

10. The method of claim 7, wherein a mathematical regression technique is used to determine the historical correlation for each of the one or more items between the sales volume and the first price difference.

11. The method of claim 7, wherein the first price difference between an asking price and a market price is either actual or proportional to either the asking price or the market price.

12. The method of claim 7, wherein the second price difference between an asking price and a market price is either actual or proportional to either the asking price or the market price.

13. A non-transitory computer-readable media embodied with software for generating a sales volume forecast, the software when executed is configured to:
access historical data reflecting a sales volume for one or more items and a first price difference between an asking price and a market price for the one or more items;
determine a historical correlation for each of the one or more items between the sales volume and the first price difference;
access a second price difference between an asking price and a market price for each of the one or more items;
apply the determined historical correlation to the second price difference to generate a sales volume forecast for each of the one or more items; and
store the generated sales volume forecast for each of the one or more items, wherein an asking price comprises at least one of an average asking price over a period of time, an average asking price across a number of different markets or a price asked for one or more items by an enterprise.

14. The computer-readable media of claim 13, wherein the market price is a market price selected from the group consisting of:
a market price associated with a particular market;
a futures contract price;
an expiration price for futures contract;
an average market price over periods of time; and
an average market price across a number of different markets.

15. The computer-readable media of claim 13, wherein the software is further configured to:
access a future date;
access market data reflecting a future market price for the one or more items, the future market price being associated with the accessed future date;
determine a third price difference between an asking price and the future market price for each of the one or more items;
apply the determined historical correlation to the determined third price difference to generate a corresponding sales volume forecast for each of the one or more items; and
store the generated corresponding sales volume forecast for each of the one or more items.

16. The computer-readable media of claim 13, wherein the software is further configured to use a mathematical regression technique to determine the historical correlation for each of the one or more items between the sales volume and the first price difference.

17. The computer-readable media of claim 13, wherein the first price difference between an asking price and a market price is either actual or proportional to either the asking price or the market price.

18. The computer-readable media of claim 13, wherein the second price difference between an asking price and a market price is either actual or proportional to either the asking price or the market price.

* * * * *